(12) United States Patent
Lee

(10) Patent No.: US 10,798,385 B2
(45) Date of Patent: Oct. 6, 2020

(54) INTER-PREDICTION METHOD AND APPARATUS IN IMAGE CODING SYSTEM

(71) Applicant: LG ELECTRONICS INC., Seoul (KR)

(72) Inventor: Jaeho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 37 days.

(21) Appl. No.: 16/096,262

(22) PCT Filed: Feb. 9, 2017

(86) PCT No.: PCT/KR2017/001395
§ 371 (c)(1),
(2) Date: Oct. 24, 2018

(87) PCT Pub. No.: WO2017/188566
PCT Pub. Date: Nov. 2, 2017

(65) Prior Publication Data
US 2019/0141333 A1 May 9, 2019

Related U.S. Application Data

(60) Provisional application No. 62/326,848, filed on Apr. 25, 2016.

(51) Int. Cl.
*H04N 19/139* (2014.01)
*H04N 19/105* (2014.01)
(Continued)

(52) U.S. Cl.
CPC ......... *H04N 19/139* (2014.11); *H04N 19/105* (2014.11); *H04N 19/124* (2014.11);
(Continued)

(58) Field of Classification Search
CPC .. H04N 19/139; H04N 19/577; H04N 19/105; H04N 19/52; H04N 19/176; H04N 19/159; H04N 19/124; H04N 19/51
See application file for complete search history.

(56) References Cited

U.S. PATENT DOCUMENTS

2003/0174769 A1* 9/2003 Nagumo ............... H04N 19/105
375/240.02
2004/0001546 A1* 1/2004 Tourapis ................ H04N 19/56
375/240.12
(Continued)

FOREIGN PATENT DOCUMENTS

KR 10-2010-0137502 A 12/2010
KR 10-2011-0112240 A 10/2011
(Continued)

*Primary Examiner* — Dramos Kalapodas
(74) *Attorney, Agent, or Firm* — Dentons US LLP

(57) ABSTRACT

An image decoding method performed by a decoding apparatus according to the present invention is characterised by comprising the steps of: deriving a reference picture list 0 (L0) and a reference picture list 1 (L1); deriving two motion vectors (MV) for a current block, wherein the two MVs include MVL0 for the L0 and MVL1 for the L1; determining whether to apply BIO prediction that derives motion vectors for each sample in the current block based on the MVL0 and the MVL1; deriving motion vectors for each sample in the current block based on the MVL0 and the MVL1 if it is determined to apply the BIO prediction; and deriving a prediction sample based on the motion vectors for each sample.

13 Claims, 6 Drawing Sheets

(51) Int. Cl.
*H04N 19/577* (2014.01)
*H04N 19/124* (2014.01)
*H04N 19/159* (2014.01)
*H04N 19/176* (2014.01)
*H04N 19/52* (2014.01)

(52) U.S. Cl.
CPC ......... *H04N 19/159* (2014.11); *H04N 19/176* (2014.11); *H04N 19/52* (2014.11); *H04N 19/577* (2014.11)

(56) References Cited

U.S. PATENT DOCUMENTS

| | | | |
|---|---|---|---|
| 2006/0233253 A1* | 10/2006 | Shi | H04N 19/513 375/240.16 |
| 2012/0147263 A1* | 6/2012 | Chen | H04N 7/0137 348/452 |
| 2013/0083851 A1* | 4/2013 | Alshin | H04N 19/182 375/240.14 |
| 2014/0328388 A1* | 11/2014 | Kim | H04N 19/105 375/240.02 |
| 2015/0350671 A1* | 12/2015 | Alshin | H04N 19/105 375/240.15 |
| 2017/0094305 A1* | 3/2017 | Li | H04N 19/52 |
| 2019/0045214 A1* | 2/2019 | Ikai | H04N 19/196 |

FOREIGN PATENT DOCUMENTS

| | | |
|---|---|---|
| KR | 10-2012-0082994 A | 7/2012 |
| KR | 10-2013-0029361 A | 3/2013 |
| KR | 10-2013-0085393 A | 7/2013 |

\* cited by examiner

INTER-PREDICTION METHOD AND APPARATUS IN IMAGE CODING SYSTEM

CROSS-REFERENCE TO RELATED APPLICATIONS

This application is the National Stage filing under 35 U.S.C. 371 of International Application No. PCT/KR2017/001395, filed on Feb. 9, 2017, which claims the benefit of U.S. Provisional Application No. 62/326,848 filed on Apr. 25, 2016, the contents of which are all hereby incorporated by reference herein in their entirety.

BACKGROUND OF THE INVENTION

Field of the Invention

The present invention relate to an image coding technique, and more particularly, to an image decoding method and apparatus in an image coding system.

Related Art

Demand for high-resolution, high-quality images such as HD (High Definition) images and UHD (Ultra High Definition) images has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

The present invention provides a method and apparatus for increasing inter-prediction efficiency.

The present invention also provides a method and apparatus for bi-prediction.

The present invention also provides a method and apparatus for deriving a sample-unit motion vector by applying bi-prediction optical flow (BIO) prediction.

The present invention also provides a method and apparatus for decreasing computational complexity of a computation for deriving a sample-unit motion vector by determining whether to apply BIO prediction.

According to an embodiment of the present invention, an image decoding method performed by a decoding device is provided. The method includes deriving a reference picture list 0 (L0) and a reference picture list 1 (L1), deriving two motion vectors (MVs) for a current block, wherein the two MVs include an MVL0 for the L0 and an MVL1 for the L1, determining whether to apply bi-prediction optical-flow (BIO) prediction that derives a sample-unit MV in the current block based on the MVL0 and the MVL1, deriving the sample-unit MV of the current block based on the MVL0 and the MVL1 if it is determined to apply the BIO prediction, and deriving a prediction sample based on the sample-unit MV.

According to another embodiment of the present invention, a decoding device performing image decoding is provided. The decoding device includes a prediction unit configured to derive an L0 and an L1, deriving two MVs for a current block, determine whether to apply BIO prediction that derives a sample-unit MV in the current block based on the MVL0 and the MVL1, derive the sample-unit MV of the current block based on the MVL0 and the MVL1 if it is determined to apply the BIO prediction, and derive a prediction sample based on the sample-unit MV.

According to another embodiment of the present invention, a video encoding method performed by an encoding device is provided. The method includes generating an L0 and an L1, deriving two MVs for a current block, wherein the two MVs include an MVL0 for the L0 and an MVL1 for the L1, determining whether to apply BIO prediction that derives a sample-unit MV in the current block based on the MVL0 and the MVL1, deriving the sample-unit MV of the current block based on the MVL0 and the MVL1 if it is determined to apply the BIO prediction, and encoding and outputting information on the prediction and information on a residual.

According to another embodiment of the present invention, a video encoding device is provided. The encoding device includes a prediction unit configured to generate an L0 and an L1, derive two MVs for a current block, wherein the two MVs include an MVL0 for the L0 and an MVL1 for the L1, determine whether to apply BIO prediction that derives a sample-unit MV in the current block based on the MVL0 and the MVL1, and derive the sample-unit MV of the current block based on the MVL0 and the MVL1 if it is determined to apply the BIO prediction, and an entropy encoding unit configured to encode and output information on the prediction and information on a residual.

According to the present invention, image coding performance based on bi-prediction optical flow (BIO) prediction can be increased while decreasing computational complexity of an encoder and a decoder.

According to the present invention, whether to apply BIO prediction of a current block can be adaptively determined, and inter-prediction efficiency can be increased while decreasing computational complexity. Therefore, overall coding efficiency can be improved.

According to the present invention, optimal prediction samples can be obtained based on the sample-unit motion vector. Therefore, an amount of data for a residual signal for a current block can be removed or decreased, and overall coding efficiency can be improved.

DESCRIPTION OF EXEMPLARY EMBODIMENTS

Figure 1:
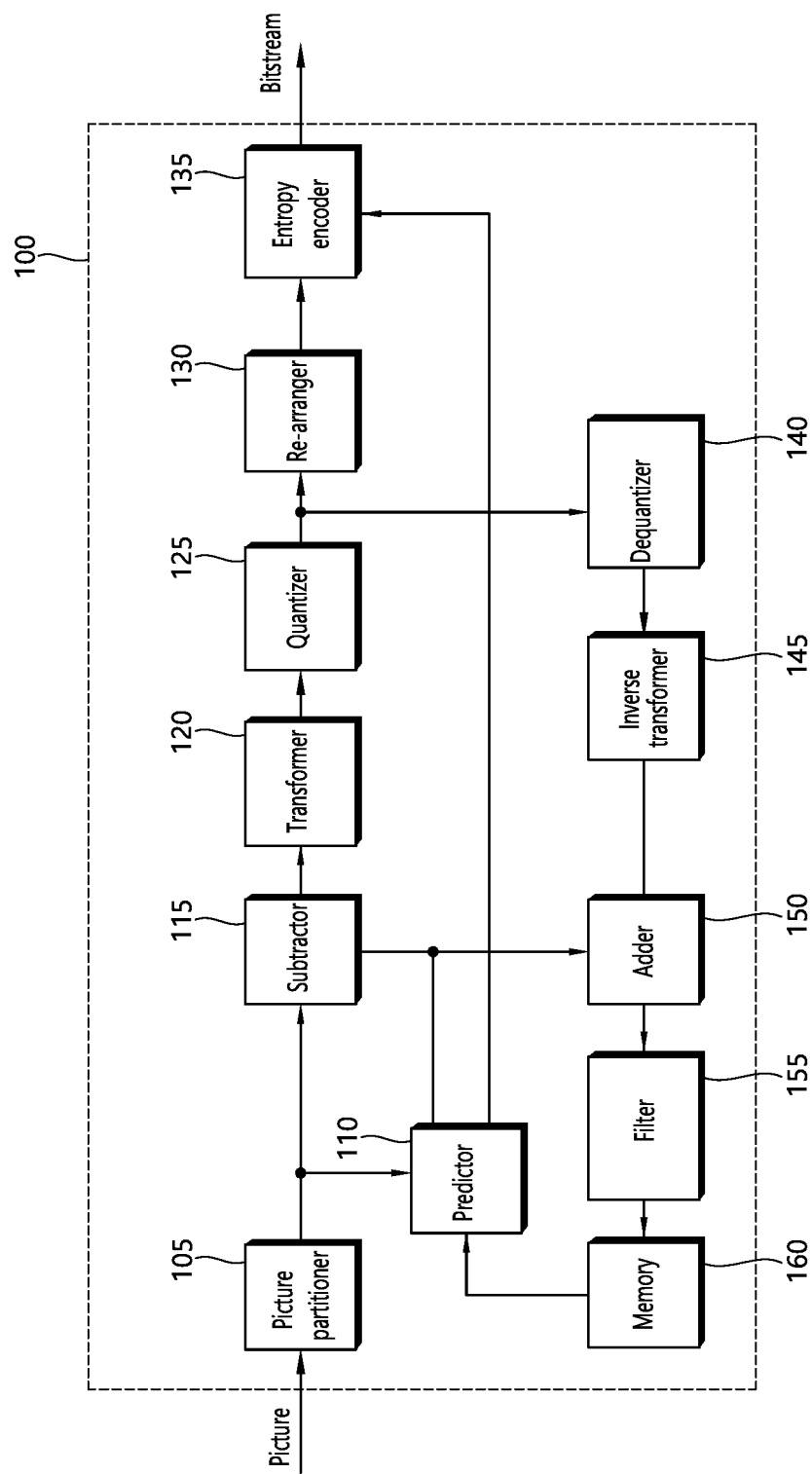
FIG. 1 is a schematic diagram illustrating a configuration of a video encoding device to which the present invention is applicable.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, embodiments of the present invention will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a 'sample' may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an MxN block may represent a set of samples or transform coefficients arranged in M columns and N rows.

FIG. 1 briefly illustrates a structure of a video encoding device to which the present invention is applicable.

Referring to FIG. 1, a video encoding device 100 includes a picture partitioner 105, a predictor 110, a subtractor 115, a transformer 120, a quantizer 125, a re-arranger 130, an entropy encoder 135, a dequantizer 140, an inverse transformer 145, an adder 150, a filter 255, and a memory 160.

The picture partitioner 105 may split an input picture into at least one processing unit. Here, a processing unit may be a coding unit (CU), a prediction unit (PU) or a transform unit (TU). The coding unit is a unit block of coding, and a largest coding unit (LCU) may be split into coding units of deeper depth according to a quad-tree structure. In this case, the largest coding unit may be used as a final coding unit or a coding unit may be recursively split into coding units of deeper depth as necessary and a coding unit having an optimal size may be used as a final coding unit based on coding efficiency according to video characteristics. When a smallest coding unit (SCU) is set, a coding unit cannot be split into a coding unit smaller than the smallest coding unit. Here, the final coding unit refers to a coding unit partitioned or split into a predictor or a transformer. A prediction unit is a block partitioned from a coding unit block and may be a unit block of sample prediction. Here, the prediction unit may be divided into sub blocks. A transform block can be split from a coding unit block according to the quad-tree structure and may be a unit block that derives a transform coefficient and/or a unit block that derives a residual signal from a transform coefficient.

Hereinafter, the coding unit may be called a coding block (CB), the prediction unit may be called a prediction block (PB), and the transform unit may be called a transform block (TB).

The prediction block or the prediction unit may mean a specific area having a block shape in a picture, and may include an array of a prediction sample. Further, the transform block or the transform unit may mean a specific area having a block shape in a picture, and may include a transform coefficient or an array of a residual sample.

The predictor 110 may perform prediction on a processing target block (hereinafter, a current block), and may generate a prediction block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and can be discriminated from a coding order.

The subtractor 115 generates a residual sample which is a difference between an original sample and a prediction sample. If the skip mode is applied, the residual sample may not be generated as described above.

The transformer 120 transforms residual samples in units of a transform block to generate a transform coefficient. The transformer 120 may perform transformation based on the size of a corresponding transform block and a prediction mode applied to a coding block or prediction block spatially overlapping with the transform block. For example, residual samples can be transformed using discrete sine transform (DST) if intra-prediction is applied to the coding block or the prediction block overlapping with the transform block and the transform block is a 4×4 residual array and is transformed using discrete cosine transform (DCT) in other cases.

The quantizer 125 may quantize the transform coefficients to generate a quantized transform coefficient.

The re-arranger 130 rearranges quantized transform coefficients. The re-arranger 130 may rearrange the quantized transform coefficients in the form of a block into a one-dimensional vector through a coefficient scanning method. Although the re-arranger 130 is described as a separate component, the re-arranger 130 may be a part of the quantizer 125.

The entropy encoder 135 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 135 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 140 dequantizes values (transform coefficients) quantized by the quantizer 125 and the inverse transformer 145 inversely transforms values dequantized by the dequantizer 135 to generate a residual sample.

The adder 150 adds a residual sample to a prediction sample to reconstruct a picture. The residual sample may be added to the prediction sample in units of a block to generate a reconstructed block. Although the adder 150 is described as a separate component, the adder 150 may be a part of the predictor 110.

The filter 155 may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter 155 may apply an adaptive loop filter (ALF) to the reconstructed picture. The ALF may be applied to the reconstructed picture to which deblocking filtering and/or sample adaptive offset has been applied.

The memory 160 may store a reconstructed picture or information necessary for encoding/decoding. Here, the reconstructed picture may be the reconstructed picture filtered by the filter 155. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
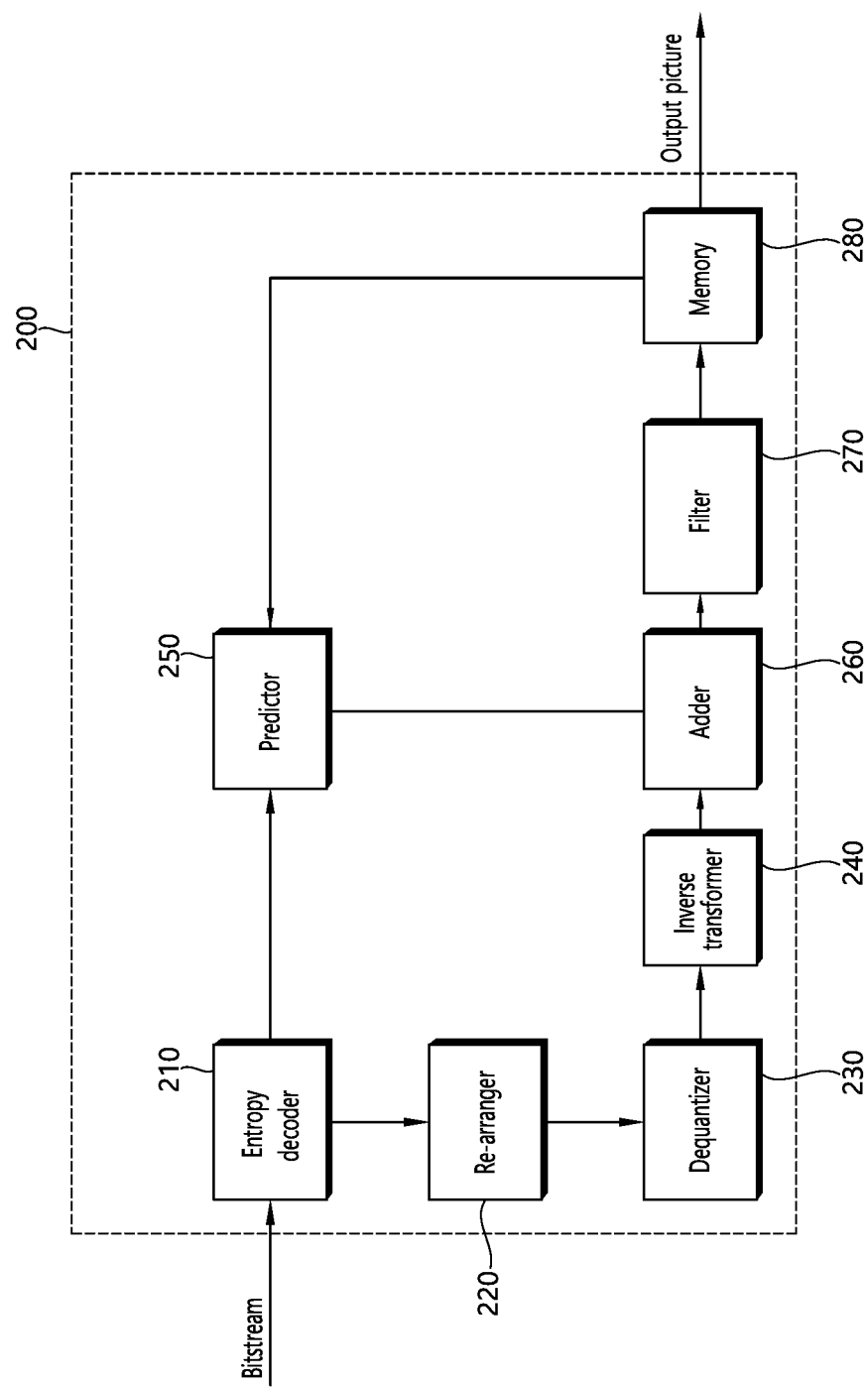
FIG. 2 is a schematic diagram illustrating a configuration of a video decoding device to which the present invention is applicable.

FIG. 2 briefly illustrates a structure of a video decoding device to which the present invention is applicable.

Referring to FIG. 2, a video decoding device 200 includes an entropy decoder 210, a re-arranger 220, a dequantizer 230, an inverse transformer 240, a predictor 250, an adder 260, a filter 270, and a memory 280.

When a bitstream including video information is input, the video decoding device 200 may reconstruct a video in association with a process by which video information is processed in the video encoding device.

For example, the video decoding device 200 may perform video decoding by using a processing unit applied in the video encoding device. Therefore, the processing unit block of video decoding may be a coding unit block, a prediction unit block, or a transform unit block. As a unit block of decoding, the coding unit block may be split according to a quad tree structure from a largest coding unit block. As a block partitioned from the coding unit block, the prediction unit block may be a unit block of sample prediction. In this case, the prediction unit block may be divided into sub blocks. As a coding unit block, the transform unit block may be split according to the quad tree structure, and may be a unit block for deriving a transform coefficient or a unit block for deriving a residual signal from the transform coefficient.

The entropy decoder 210 may parse the bitstream to output information required for video reconstruction or picture reconstruction. For example, the entropy decoder 210 may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of amabol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information about prediction among information decoded in the entropy decoder 210 may be provided to the predictor

250 and residual values, that is, quantized transform coefficients, on which entropy decoding has been performed by the entropy decoder 210 may be input to the re-arranger 220.

The re-arranger 220 may rearrange the quantized transform coefficients into a two-dimensional block form. The re-arranger 220 may perform rearrangement corresponding to coefficient scanning performed by the encoding device. Although the re-arranger 220 is described as a separate component, the re-arranger 220 may be a part of the quantizer 230.

The dequantizer 230 may de-quantize the quantized transform coefficients based on a (de)quantization parameter to output a transform coefficient. In this case, information for deriving a quantization parameter may be signaled from the encoding device.

The inverse transformer 240 may inverse-transform the transform coefficients to derive residual samples.

The predictor 250 may perform prediction on a current block, and may generate a prediction block including prediction samples for the current block. A unit of prediction performed in the predictor 250 may be a coding block or may be a transform block or may be a prediction block.

The predictor 250 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 250 may derive a prediction sample for a current block based on a neighboring reference sample in a current picture. The predictor 250 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 250 may derive a prediction sample for a current block based on a sample specified in a reference picture according to a motion vector. The predictor 250 may derive the prediction sample for the current block using one of the skip mode, the merge mode and the MVP mode. Here, motion information required for inter-prediction of the current block provided by the video encoding device, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 250 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 250 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 250 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor 250 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 260 can add a residual sample to a prediction sample to reconstruct a current block or a current picture. The adder 260 may reconstruct the current picture by adding the residual sample to the prediction sample in units of a block. When the skip mode is applied, a residual is not transmitted and thus the prediction sample may become a reconstructed sample. Although the adder 260 is described as a separate component, the adder 260 may be a part of the predictor 250.

The filter 270 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 280 may store a reconstructed picture or information necessary for decoding. Here, the reconstructed picture may be the reconstructed picture filtered by the filter 270. For example, the memory 280 may store pictures used for inter-prediction. Here, the pictures used for inter-prediction may be designated according to a reference picture set or a reference picture list. A reconstructed picture may be used as a reference picture for other pictures. The memory 280 may output reconstructed pictures in an output order.

One or two reference picture lists may be used for inter-prediction for a current block. That is, a reference picture list 0 or a reference picture list 1 may be used for prediction for the current block, or both of the reference picture lists 0 and 1 may be configured. For example, if a slice in which the current block is included has a slice type of B (B-slice), at least one of the two reference picture lists may be used, and if the slice in which the current block is included has a slice type of P (P-slice), only the reference picture list 0 may be used. The reference picture list 0 may be called a list 0 (L0), and the reference picture list 1 may be called a list 1 (L1). When performing prediction for the current block, if inter-prediction is performed based on the L0, it may be called L0 prediction, if inter-prediction is performed based on the L1, it may be called L1 prediction, and if inter-prediction is performed based on the L0 and the L1, it may be called bi-prediction. In this case, a separate motion vector may be used for each of the L0 prediction and the L1 prediction. For example, a motion vector MVL0 for the L0 prediction for the current block and a motion vector MVL1 for the L1 prediction may be derived separately. In this case, for example, if the MVL0 indicates a first reference region in a first reference picture in the L0 and if the MVL1 indicates a second reference region in a second reference picture in the L1, a prediction sample of the current block may be derived through a weighted sum of a first predictor obtained from a reconstruction sample of the first reference region and a second prediction obtained from a reconstruction sample of the second reference region. Herein, the weighted sum may be performed based on a first time distance between the current picture and a first reference picture and a second time distance between the current picture and the second reference picture. Herein, the time distance may indicate a picture order count (POC) difference. That is, a difference between a POC value of the current picture and a POC value of the first reference picture may be the first time distance, and a difference between the POC value of the current picture and a POC value of the second reference picture may be the second time distance.

Meanwhile, according to the present invention, when the bi-prediction is applied, a sample-unit motion vector may be obtained based on a first predictor and a second predictor and the MVL0 and MVL1 for the current block, thereby being able to derive a prediction sample with more improved prediction performance. This may be called bi-prediction optical flow (BIO) prediction, and the prediction sample may be called a refined prediction sample or a BIO prediction sample to distinguish from the exiting prediction sample. In addition, the sample-unit motion vector may be called a refined motion vector or a BIO motion vector. The refined motion vector and the refined prediction sample may be derived for example by using the following method.

A motion of an object based on optical flow (OF) may be expressed by the following equation under the assumption that there is no change in brightness constancy constraint (BCC), i.e., a sample (pixel) value of the object in consecutive frames.

$$I(x,y,t)=I(x+\Delta x, y+\Delta y, t+\Delta t)$$ [Equation 1]

Herein, I(x,y,t) denotes a sample value at a sample position (x,y) and a time t, and Δ denotes a variation. Assuming a small movement, the right term of Equation 1 above may be expressed as a first order equation of Taylor Series as follows.

$$I(x, y, t) = I(x, y, t) + \frac{\partial I}{\partial x}\Delta x + \frac{\partial I}{\partial y}\Delta y + \frac{\partial I}{\partial t}\Delta t$$ [Equation 2]

Herein, Equation 2 may be divided by Δt and is summarized as follows.

$$0 = \frac{dI}{dt} = \frac{\partial I}{\partial x}V_x + \frac{\partial I}{\partial y}V_y + \frac{\partial I}{\partial t}$$ [Equation 3]

Herein, $V_x = \Delta x/\Delta t$ and $V_y = \Delta y/\Delta t$.

The equation above includes two unknown values (a motion and a spatial derivative of a signal). Therefore, the spatial derivative is required for motion analysis.

According to the present invention, by using an optical flow (OF) characteristic, a reference sample value and a motion vector refined on a sample (pixel) basis may be obtained without additional transmission of the motion vector. For example, in addition to the BCC, if it is assumed that an object moves with a specific speed during a short period of time, the MVL0 and the MVL1 may be expressed by symmetric values of the same magnitude. In other words, x-components of the MVL0 and the MVL1 may have the same magnitude and different signs, and y-components of the MVL0 and the MVL1 may have the same magnitude and different signs. For example, if the x-component and y-component of the MVL0 are respectively Vx and Vy, the x-component and y-component of the MVL1 may be respectively −Vx and −Vy.

Figure 3:
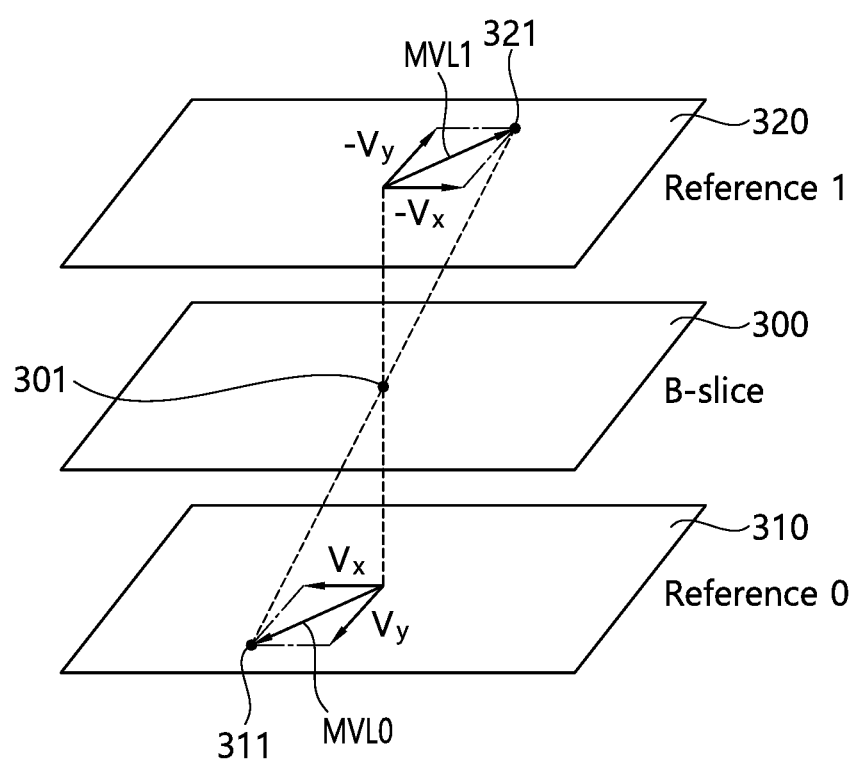
FIG. 3 show an example of bi-prediction motion vectors under the assumption that a brightness constancy constraint (BCC) and an object move with a specific speed during a short period of time.

FIG. 3 show an example of bi-prediction motion vectors under the assumption that a BCC and an object move with a specific speed during a short period of time.

Referring to FIG. 3, assuming that the BCC and the object move with a specific speed during a short period of time, in bi-prediction for a current block in a current picture 300, an MVL0 indicates a motion vector indicating a first reference block in a first reference picture (reference 0) 310 corresponding to the current block, and an MVL1 indicates a motion vector indicating a second reference block in a second reference picture (reference 1) 320 corresponding to the current block. The first reference picture may be one of reference pictures included in the L0, and the second reference picture may be one of reference pictures included in the L1. In this case, a representative position of each block may be a top-left sample position of each block. In this case, the MVL0 and the MVL1 may be expressed by mutually symmetric values.

In FIG. 3, a first reference sample value of a position 311 based on the MVL0 and a second reference sample value of a position 321 based on the MVL1 may be derived based on a sample 301 in the current block. Herein, the first reference sample value may be called a first predictor or an L0 predictor, and the second reference sample value may be called a second predictor or an L1 predictor. A difference between the first reference sample value and the second reference sample value may be summarized by the following equation.

$$\Delta[i,j]=I^0[i+v_x,j+v_y]-I^1[i-v_x,j-v_y] \quad \text{[Equation 4]}$$

Herein, $I^0[i+v_x, j+vd_y]$ denotes a sample value (i.e., a first reference sample value) in the sample position 311 of the first reference picture (reference 0) 310, and $I^1[i-v_x, j-v_y]$ denotes a sample value (i.e., a second reference sample value) in the sample position 321 of the second reference picture (reference 1) 320. The sample values may be expressed by the following equation.

$$I^0[i+v_x, j+v_y] = \quad \text{[Equation 5]}$$
$$I^0[i,j] + \frac{\partial I^0[i,j]}{\partial x}v_x + \frac{\partial I^0[i,j]}{\partial y}v_y$$
$$I^1[i-v_x, j-v_y] = I^1[i,j] - \frac{\partial I^1[i,j]}{\partial x}v_x - \frac{\partial I^1[i,j]}{\partial y}v_y$$

In addition, Equation 5 above may be substituted to Equation 4 above so as to be summarized as shown in Equation 6 below.

$$\Delta[i,j]=I^{(0)}[i,j]-I^{(1)}[i,j]+v_x[i,j](I_x^{(0)}[i,j]+I_x^{(1)}[i,j])+v_y[i,j]$$
$$(I_y^{(0)}[i,j]+I_y^{(1)}[i,j]) \quad \text{[Equation 6]}$$

Herein, $I^{(0)}[i,j]$ denotes an L0 reference sample value, $I^{(1)}[i,j]$ denotes an L1 reference sample value, $I_x^{(k)}[i,j]$ and $I_y^{(k)}[i,j]$ respectively denote x-axis and y-axis variations, that is, a gradient. Specifically, $I_x^{(0)}[i,j]$ and $I_y^{(0)}[i,j]$ are respectively x-axis and y-axis derivative values at a position [i,j] of the first reference picture (reference 0) 310 in the L0, and $I_x^{(1)}[i,j]$ and $I_y^{(1)}[i,j]$ are respectively x-axis and y-axis derivative values at a position [i,j] of the second reference picture (reference 1) 320 in the L1. The derivative values may be called a gradient.

Meanwhile, in order to increase accuracy and prediction efficiency, the gradients may be expressed by Equation 7 below based on an interpolation filter. A position and/or unit for allocating a filter coefficient of the interpolation filter may be called a filter tap. The filter coefficient of the interpolation filter may be allocated in unit of ¼ fractional sample.

$$I_x^{(k)}[i,j] = \sum_{n=-M+1}^{M} dF_n(\alpha_x^{(k)})R^{(k)}[i+n, j], k = 0 \text{ or } 1 \quad \text{[Equation 7]}$$
$$I_y^{(k)}[i,j] = \sum_{n=-M+1}^{M} dF_n(\alpha_y^{(k)})R^{(k)}[i, j+n], k = 0 \text{ or } 1$$

Herein, 2M denotes the number of filter taps of the interpolation filter, $\alpha_x^{(k)}$ and $\alpha_y^{(k)}$ respectively denote fractional parts of an x-component and y-component of the motion vector, $dF_n(\alpha_x^{(k)})$ and $dF_n(\alpha_y^{(k)})$ denote a filter coefficient of an $n^{th}$ filter tap respectively for $\alpha_x^{(k)}$ and $\alpha_y^{(k)}$, and $R^{(k)}[i+n, f]$ denotes a reconstruction sample value at a position [i+n, j] after bi-prediction, that is, a reference sample value at a position [i+n,j] of a reference picture. A value of the fractional part of the x-component and/or y-component of the motion vector may be one of 0, ¼, 2/4, and ¾.

Specifically, $\alpha_x^{(0)}$ and $\alpha_y^{(0)}$ respectively denote fractional parts of an x-component and y-component of the MVL0, $dF_n(\alpha_x^{(0)})$ and $dF_n(\alpha_y^{(0)})$ denote a filter coefficient of an $n^{th}$ filter tap respectively at $\alpha_x^{(0)}$ and $\alpha_y^{(0)}$, and $R^{(0)}[i+n, f]$ denotes a reference sample value at a position [i+n,j] of the first reference picture (reference 0) 310. In addition, $\alpha_x^{(1)}$ and $\alpha_y^{(1)}$, respectively denote an x-component and y-component of the MVL1, $dF_n(\alpha_x^{(1)})$ and $dF_n(\alpha_y^{(1)})$ denote a filter coefficient of an $n^{th}$ filter respectively at $\alpha_x^{(1)}$ and $\alpha_y^{(1)}$, and $R^{(1)}[i+n, j]$ denotes a reference sample value at a position [i+n,j] of the second reference picture (reference 1) 320.

For example, if the number of filter taps is 6 (that is, 2M is 6), the filter tap coefficient of the interpolation filter for the fractional part of the x-component and y-component of the motion vector may be defined as shown in the following table.

TABLE 1

| Fractional pel position | Interpolation filter for gradient |
| --- | --- |
| 0 | {8, −39, −3, 46, −17, 5}, |
| ¼ | {4, −17, −36, 60, −15, 4}, |
| 2/4 | {−1, 4, −57, 57, −4, 1}, |
| ¾ | {−4, 15, −60, 36, 17, −4} |

Sample-unit motion vectors $v_x[i,j]$ and $v_y[i,j]$ for allowing to have a minimum value may be calculated based on Equation 6 above. For example, it may be assumed that samples in a specific region centering at [i,j], that is, a window Ω, have a locally steady motion. Herein, the window Ω may include (2M+1)×(2M+1) samples. In this case, a sample position in the window Ω may be expressed by [i',j']. In this case, i−M≤i'≤i+M and j−M≤j'≤j+M are satisfied at [i',j']. Based on this, a motion vector which minimizes $\Sigma_\Omega \Delta^2[i',j']$ may be calculated. In this case, $\Delta^z[i,j]$ may be expressed as shown in the following equation by considering an assumption that samples in the window Ω have the locally constant motion.

$$\sum_\Omega \Delta 2(i', j') = \left(Vx\sum_\Omega Gx + Vy\sum_\Omega Gy + \sum_\Omega \delta P\right)^2 \quad \text{[Equation 8]}$$

Herein, $Gx=(I_x^{(0)}[i',j']+I_x^{(1)}[i',j'])$, $Gy=I_y^{(0)}[i',j']+I_y^{(1)}[i',j']$, $\delta P=(P^{(C)}[i', j']-P^{(1)}[i', j'])$. Herein, $P^{(0)}[i',j']$ and $P^{(1)}[i',j']$ respectively denote an L0 predictor and an L1 predictor. $P^{(0)}[i',j']$ and $P^{(1)}[i',j']$ respectively correspond to $I^0[i',j']$ and $I^1[i',j']$.

Equation 7 above may be partially differentiated into Vx and Vy as follows.

$$Vx\Sigma_\Omega G^2x+Vy\Sigma_\Omega GxGy+\Sigma_\Omega Gx\delta P=0$$
$$Vx\Sigma_\Omega GxGy+Vy\Sigma_\Omega G^2y+\Sigma_\Omega Gy\delta P=0 \quad \text{[Equation 9]}$$

Herein, if s1, s2, s3, and s4 are substituted to Equation 9 above when s1=$\Sigma_\Omega G^2x$, s2=s4=$\Sigma_\Omega GxGy$, s3=−$\Sigma_\Omega Gx\delta P$ s5=$\Sigma_\Omega G^2y$, it may be expressed as shown in Equation 10 and Equation 11 below.

$$0 = \sum_{[i',j]\in\Omega} 2G_x(v_xG_x + v_yG_y + \delta P) \quad \text{[Equation 10]}$$
$$0 = \sum_{[i',j]\in\Omega} 2v_xG_x^2 + 2v_yG_xG_y + 2G_x\delta P$$
$$0 = 2v_x\sum_{[i',j]\in\Omega} G_x^2 + 2v_y\sum_{[i',j]\in\Omega} G_xG_y + 2\sum_{[i',j]\in\Omega} G_x\delta P$$
$$0 = 2v_xs_1 + 2v_ys_2 - 2s_3$$
$$v_x = \frac{-v_ys_2 + s_3}{s_1}$$

-continued $$0 = \sum_{[i',j]\in\Omega} 2G_y(v_xG_x + v_yG_y + \delta P)$$ [Equation 11]

$$0 = \sum_{[i',j]\in\Omega} (2v_xG_xG_y + 2v_yG_y^2 + 2G_y\delta P)$$

$$0 = 2v_x \sum_{[i',j]\in\Omega} G_xG_y + 2v_y \sum_{[i',j]\in\Omega} G_y^2 + 2\sum_{[i',j]\in\Omega} G_y\delta P$$

$$0 = 2v_xs_4 + 2v_ys_5 - 2s_6$$

$$v_y = \frac{-v_xs_4 + s_6}{s_5}$$

Vx and Vy may be summarized as follows based on Equation 10 and Equation 11 above.

$$v_x = \frac{-\frac{-v_xs_4+s_6}{s_5}s_2 + s_3}{s_1} = \frac{s_3s_5 - s_2s_6}{s_1s_5 - s_2s_4}$$ [Equation 12]

$$v_y = \frac{-\frac{-v_ys_2+s_3}{s_1}s_4 + s_6}{s_5} = \frac{s_1s_6 - s_3s_4}{s_1s_5 - s_2s_4}$$

That is, Vx and Vy may be summarized as follows.

$$Vx = \frac{s3s5 - s2s6}{s1s5 - s2s4}, \quad Vy = \frac{s1s6 - s3s4}{s1s5 - s2s4}$$ [Equation 13]

Therefore, a refined predictor (prediction sample value) for a target sample may be calculated as follows by using Vx and Vy.

$$P = ((P^{(0)} + P^{(1)}) + V_x(I_x^{(0)} - I_x^{(1)}) + V_y(I_y^{(0)} - I_y^{(1)})) \gg 1$$ [Equation 14]

Based on the aforementioned method, a sample-unit refined motion vector and prediction sample value may be obtained. Herein, P denotes a refined predictor for the target sample, and Vx and Vy respectively denote an x-component and y-component of the refined motion vector for the target sample.

Deriving of the refined prediction sample according to the present invention may be performed based on a procedure as shown in the following table.

TABLE 2

Step 1: A predictor (a reference picture value obtained by bi-prediction) pred_bi of L0 and L1 is obtained by performing bi-prediction.
Step 2: A BIO predictor pred_BIO is obtained by performing BIO and is used as a final predictor.
   Step 2-1: Each of sample (pixel)-unit gradients $I_x^{(0)}$, $I_y^{(0)}$, $I_x^{(1)}$, $I_y^{(1)}$ is obtained (an interpolation filter of Table 1 and Equation 7 is used)
   Step 2-2: Each sample (pixel)-based BIO motion vector $(V_x, V_y)$ is obtained (Equation 13 is used).
   Step 2-3: Each sample (pixel)-based BIO predictor is obtained and used as a final predictor (Equation 14 is used).

Referring to Table 2, a coding device may perform bi-prediction in unit of a sample of a current block to obtain an L0 predictor and an L1 predictor (Step 1). The bi-prediction may be expressed by pred_bi. Specifically, the coding device may obtain an MVL0 and an MVL1, may derive a first reference region on a first reference picture included in an L0 based on the MVL0, and may derive a second reference region on a second reference picture included in an L1 based on the MVL1. From a perspective of a target sample, the first reference region includes an L0 predictor for the target sample, and the second reference region includes an L1 predictor for the target sample. Herein, the L0 predictor may correspond to an L0 reference sample value, and the L1 predictor may correspond to an L1 reference sample value.

When it is determined to apply the BIO prediction to the current block, the coding device may obtain a refined in unit of a sample of the current block, and may use the refined predictor as a final predictor (Step 2). The refined predictor may be called a BIO predictor, and inter-prediction for obtaining the refined predictor may be called BIO prediction. The BIO prediction may be expressed by pred_BIO.

A case where the BIO prediction is performed is described in detail as follows. The coding device may calculate a sample-unit gradient for the current block (step 2-1). The coding device may calculate the sample-unit gradient based on the MVL0, the MVL1, the first reference region, and the second reference region. The gradient may correspond to $I_x^{(0)}[i,j]$, $I_y^{(0)}[i,j]$, $I_x^{(1)}[i,j]$, and $I_y^{(1)}[i,j]$ of Equation 7 above.

The coding device may derive a refined motion vector (MV) on a sample basis (step 2-2). An x-component and y-component of the refined MV may respectively correspond to Vx and Vy. The coding device obtains a refined MV in which an error $$\left(\text{e.g.,} \sum_{\Omega} \Delta 2(i', j')\right)$$

in an M×N region (or window) centering on a target sample is minimized. In this case, the coding device may obtain the refined MV based on Equations 8 to 13 above.

The coding device may obtain a refined predictor on a sample basis, and may use the refined predictor as a final predictor (step 2-3). The coding device may obtain the refined predictor based on the sample-unit gradient and the sample-unit refined MV, and may derive the sample-unit refined prediction sample based on the predictor. In this case, the coding device may derive the sample-unit refined prediction sample based on Equation 4 above.

The aforementioned method of deriving the refined prediction sample is a method which assumes that two MVs (i.e., MVL0 and MVL1) with the same size and symmetric to each other have a constant motion. In other words, the aforementioned method of deriving the refined prediction sample may be a method which assumes a case where a first time distance between a current picture and a first reference picture associated with the MVL0 and a second time distance between the current picture and a second reference picture associated with the MVL1 are equal to each other. A difference between a POC value of the current value and a POC value of the first reference picture may be the first time distance, and a difference between the POC value of the current picture and a POC value of the second reference picture may be the second time distance.

Meanwhile, the method of deriving the refined prediction sample may be performed by considering the two MVs having a constant motion when the first time distance and the second time distance are not equal to each other.

Figure 4:
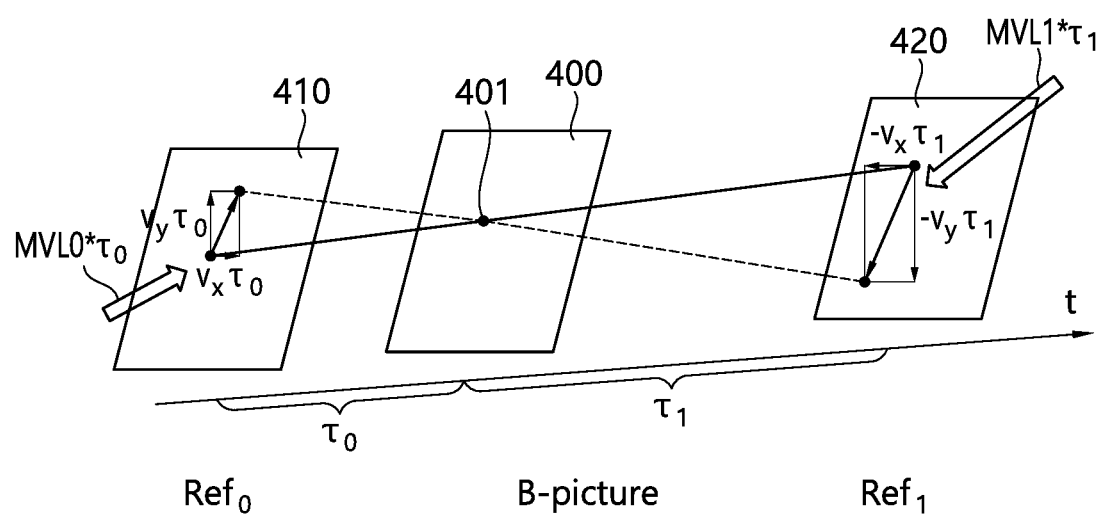
FIG. 4 shows an example of bi-prediction motion vectors (MVs) when a first time distance and a second time distance are not equal to each other.

FIG. 4 shows an example of bi-prediction MVs when a first time distance and a second time distance are not equal to each other. Referring to FIG. 4, in bi-prediction for a current block in a current picture 400, an MVL0 indicates a motion vector indicating a first reference block in a first reference picture (reference 0) 410 corresponding to the current block, and an MVL1 indicates a motion vector indicating a second reference block in a second reference picture (reference 1) 420 corresponding to the current block. The first reference picture may be one of reference pictures included in an L0, and the second reference picture may be one of reference pictures included in an L1. In this case, a representative position of each block may be a top-left sample position of each block. In this case, the MVL0 and the MVL1 may be expressed by mutually symmetric values. If the first time distance is different from the second time distance and if the MVL0 and the MVL1 are symmetric values, an x-component of a value obtained by multiplying the MVL0 by the second time distance and an x-component of a value obtained by multiplying the MVL1 by the first time distance may have the same magnitude and different sings, and a y-component of a value obtained by multiplying the MVL0 by the second time distance and a y-component of a value obtained by multiplying the MVL1 by the first time distance may have the same magnitude and different sings. In other words, an absolute value of a first vector derived by multiplying the MVL0 by the second time distance may be equal to an absolute value of a second vector derived by multiplying the MVL1 by the first time distance, and directions of the first vectors and the second vector may be opposite to each other. Specifically, for example, if the x-component and y-component of the value obtained by multiplying the MVL0 by the second time distance are respectively $Vx_0*\tau_i$ and $Vy_0*\Sigma_1$, the x-component and y-component of the value obtained by multiplying the MVL1 by the first time distance may be respectively $-Vx_0*\tau_1$(equal to $Vx_1*\tau_0$), and $-Vy_0*\tau_1$(equal to $Vy_1*\tau_0$).

In FIG. 4, a first reference sample value of a position based on the MVL0 and a second reference sample value of a position based on the MVL1 may be derived based on a target sample 401 in a current block. Herein, the first reference sample value may be called a first predictor or an L0 predictor, and the second reference sample value may be called a second predictor or an L1 predictor.

When it is determined to apply BIO prediction to the current block, the coding device may derive a sample-unit MV for a target sample on the current value based on the two MVs, and may derive a refined prediction sample based on the sample-unit MV. In this case, Equation 14 above may be calculated again as follows by considering that the first time distance and the second time distance have different values as shown in FIG. 4.

$$P = ((P^{(0)} + P^{(1)}) + V_x(\tau_0 I_x^{(0)} - \tau_1 I_x^{(1)}) + V_y(\tau_0 I_y^{(0)} - \tau_1 i_y^{(1)})) \gg 1$$ [Equation 15]

Herein, P denotes a refined predictor for the target sample, P(0) and P(1) respectively denote a first predictor and second predictor for the current sample, $I_x^{(0)}$ and $I_y^{(0)}$ respectively denote an x-axis gradient and y-axis gradient in the first predictor, $I_x^{(1)}$ and $I_y^{(1)}$ respectively denote an x-axis gradient and y-axis gradient in the second predictor, Vx and Vy respectively denote an x-component and y-component of the refined MV for the target sample, $\tau_0$ denotes the first time distance, and $\tau_1$ denotes the second time distance. The first time distance and the second time distance may denote a distance between the current picture (or current frame) and a reference picture (or reference frame).

The first time distance and the second time distance may be derived based on the following equation.

$$\tau_0 = POC(current) - POC(Ref0)$$

$$\tau_1 = POC(Ref1) - POC(current)$$ [Equation 16]

Herein, POC(current) denotes a picture order count (POC) value of the current picture, POC(Ref0) denotes a POC value of the first reference picture, and POC(Ref1) denotes a POC value of the second reference picture.

Meanwhile, Equation 13 may be used through approximation in order to reduce computational complexity in the method of deriving the refined prediction sample. Equation 13 above may be approximated as shown in the following equation.

The following equation may be derived by dividing a numerator and denominator of Vx by s5 in Equation 13.

$$Vx = \frac{s3 - s2s6/s5}{s1 - s2s4/s5}$$ [Equation 17]

If the value of s5 in Equation 17 above is a sufficiently great value, s2*s6/s5 of the denominator and s2*s4/s5 of the numerator of Equation 17 above may be approximated to zero. Therefore, Equation 17 above may be expressed by the following equation.

$$Vx = \frac{s3}{s1}$$ [Equation 18]

When Vx derived from Equation 18 above is substituted to Vy in Equation 11 above, Vy may be derived based on the following equation.

$$Vy = \frac{s6 - Vx*s4(=s2)}{s5}$$ [Equation 19]

Based on Equation 19 above, Vy is summarized as follows.

$$Vy = \frac{s6 - Vx*s2}{s5}$$ [Equation 20]

Computational complexity for deriving Vx and Vy can be decreased based on Equation 18 and Equation 20 above. Accordingly, overall computational complexity of the method of deriving the refined prediction sample can be decreased.

Meanwhile, the method of deriving the refined sample may be performed under the assumption that an optimal prediction sample of the target sample is a sample of a case where there is an L0 reference picture and L1 reference picture for bi-prediction with respect to a current picture, and an MVL0 associated with the L0 reference picture and an MVL1 associated with the L1 reference picture have symmetric values of the same size. That is, it may be performed under the assumption that a region in which the target sample is included has a constant motion. Therefore, a refined predictor derived based on Equation 14 above may be expressed as a value derived by assuming the constant motion. Therefore, if a predictor derived using the conventional method other than the method of deriving the refined prediction sample, that is, a predictor derived by performing bi-prediction, has the same value as that derived by assuming the constant motion, the method of deriving the refined prediction sample may not be performed.

If the bi-prediction for the current block has a constant motion before the method of deriving the refined prediction sample is performed, the coding device may determine not to apply the BIO prediction to the current block. In other words, if the bi-prediction for the current block has the constant motion, the coding device may use predictors derived based on the MVL0 and the MVL1 as a final predictor. The case of having the constant motion may be represented as a case where the MVL0 and the MVL1 have the same size and symmetric directions. In addition, in this case, since the first time distance and the second time distance may have different values, the first time distance and the second time distance may be considered in a process of determining whether to have the constant motion. The process of determining whether to have the constant motion by considering the first time distance and the second time distance may be performed, for example, by a procedure as shown in the following table.

TABLE 3

IF (($\tau_1 mvx_0$ == $-\tau_0 mvx_1$) && ($\tau_1 mvy_0$ = $-\tau_0 mvy_1$))
   Not perform BIO.
   Select the bi-prediction predictor as the optimal predictor.
ELSE
   Perform BIO
   Select the BIO predictor as the optimal predictor Herein, BIO may indicate the method of deriving the refined prediction sample, $mvx_0$ may denote an x-component of the MVL0, $mvy_0$ may denote a y-component of the MVL0, $mvx_1$ may denote an x-component of the MVL1, $mvy_1$ may denote a y-component of the MVL1, $\tau_0$ may denote the first time distance, and $\tau_1$ may denote the second time distance. The method of deriving the refined prediction sample may be called BIO prediction.

As shown in Table 3 above, if a value obtained by multiplying the x-component of the MVL0 by the second time distance and a value obtained by multiplying the x-component of the MVL1 by the first time distance have the same magnitude and different signs, and if a value obtained by multiplying the y-component of the MVL0 by the second time distance and a value obtained by multiplying the y-component of the MVL1 by the first time distance have the same magnitude and different signs, the coding device may use a predictor derived based on the MVL0 and the MVL1 as a final predictor without having to perform the BIO prediction. In other words, if an absolute value of a first vector derived by multiplying the MVL0 by the second time distance is equal to an absolute value of a second vector derived by multiplying the MVL1 by the second time distance and if the first vector and the second vector have directions opposite to each other, the coding device may use the predictor derived based on the MVL0 and the MVL1 as the final predictor without having to perform the BIO prediction. Otherwise, the coding device may derive a sample-unit MV of the current block based on the MVL0 and the MVL1, and may derive a refined predictor based on the sample-unit MV and use the refined predictor as the final predictor.

For another example, the coding device may determine to refine the two MVs if the first time distance between the current picture (or current frame) and the first reference picture and the second time distance between the current picture (or current frame) and the second reference picture are equal to each other. A detailed procedure of the above determination may be expressed by the following table.

TABLE 4

IF (($\tau_0$ == $\tau_1$) && ($mvx_0$ == $-mvx_1$) && ($mvy_0$ = $-mvy_1$))
   Not perform BIO.
   Select the bi-prediction predictor as the optimal predictor.
ELSE
   Perform BIO
   Select the BIO predictor as the optimal predictor.

As shown in Table 4 above, if the first time distance and the second time distance have the same magnitude, if an x-component of the MVL0 and an x-component of the MVL1 have the same magnitude and different signs, and if a y-component of the MVL0 and a y-component of the MVL1 have the same magnitude and different signs, the coding device may use a predictor derived based on the MVL0 and the MVL1 as a final predictor without having to perform the BIO prediction for the current block. In addition, if it is not the case, the coding device may derive the sample-unit MV of the current block based on the MVL0 and the MVL1, and may derive a refined predictor based on the sample-unit MV and thus may use the refined predictor as a final predictor.

For another example, the coding device may consider a size of the current block in the determining of whether to apply BIO prediction of the current block. When it is determined that bi-prediction of the current block has a constant motion through the method based on Table 3 and Table 4 above, since all sample values of the current block are considered in this case, an optimal motion for each sample of the current block may have a difference with respect to the constant motion. In other words, there may be a difference between MVs derived by performing the bi-prediction and optimal MVs for each of the samples, and the difference value may be called a motion residual. The smaller the size of the current block, the smaller the motion residual may be. Therefore, a method of determining not to apply BIO prediction to the current block by determining whether it has a constant motion on the block basis can further improve prediction performance if it is restricted to determine not to apply the BIO prediction to the current block only when a size of the current block is smaller than an arbitrary size. That is, if the size of the current block is smaller than the arbitrary size, since a difference between prediction performance of the bi-prediction and prediction performance of the BIO prediction may be small or the prediction performance of the bi-prediction may be better than the prediction performance of the BIO prediction, the coding device may derive a prediction sample based on the bi-prediction.

The current block may be a current prediction unit (PU) or a current sub PU which is partitioned from the current PU. A minimum size of the current PU may be 8×8, or a minimum size of the current sub PU may be 4×4. Therefore, the arbitrary size may be set to 4×4. In this case, the coding device may determine not to apply BIO prediction to the current block only when the size of the current block is 4×4.

In addition, a residual for a case of performing the BIO prediction and a residual for a case of performing only the bi-prediction without having to perform the BIO prediction may be measured. The residuals may be compared to identify whether prediction performance is improved through statistics in the case of performing the BIO prediction, and the residual size may be determined based on the statistics. The statistics may be as shown in the following table.

TABLE 5

Performance comparison of BIO and bi-prediction based on sub-PU size

| | Sub-PU size | | | | |
|---|---|---|---|---|---|
| | 4 | 8 | 16 | 32 | 64 |
| Prob. of sad (bi) <= sad (BIO) | 82.24% | 23.44% | 20.63% | 12.04% | 0.00% |

Herein, Prob. Of sad(bi)<=sad(BIO) indicates a probability that the residual for the case of performing only the bi-prediction without having to perform the BIO prediction is smaller than the residual for the case of performing the BIO prediction. As shown in Table 5 above, if a size of the PU is 4×4, a probability that the bi-prediction shows superior performance than the BIO prediction is about 82%. Therefore, if the size of the current block is 4×4, it may be determined that a difference of prediction performance is not great even if the BIO prediction is not performed. However, according to Table 5 above, if the size of the current block is equal to or greater than 8×8, it shows that a probability that prediction performance will be more improved is high when the BIO prediction is performed. Accordingly, if the size of the current block is equal to or greater than 8×8, deterioration of prediction performance may be great when the BIO prediction is not performed. Therefore, if the size of the current block is equal to or greater than 8×8, the coding device may perform the BIO prediction even if the bi-prediction for the current block has a constant motion.

For example, a detailed procedure for the aforementioned method may be as shown in the following table.

TABLE 6

IF (($\tau_1$mvx$_0$ == -$\tau_0$mvx$_1$) && ($\tau_1$mvy$_0$ = -$\tau_0$mvy$_1$) && (sub-PU == 4×4))
  Not perform BIO.
  Select the bi-prediction predictor as the optimal predictor.
ELSE
  Perform BIO
  Select the BIO predictor as the optimal predictor Herein, sub-PU indicates a size of the current block.

As shown in Table 6 above, if a value obtained by multiplying the x-component of the MVL0 by the second time distance and a value obtained by multiplying the x-component of the MVL1 by the first time distance have the same magnitude and different signs, if a value obtained by multiplying the y-component of the MVL0 by the second time distance and a value obtained by multiplying the y-component of the MVL1 by the first time distance have the same magnitude and different signs, and if a size of the current block is 4×4, the coding device may use a predictor derived based on the MVL0 and the MVL1 as a final predictor without having to perform the BIO prediction. In addition, if it is not the case, the coding device may derive the sample-unit MV of the current block based on the MVL0 and the MVL1, and may derive a refined predictor based on the sample-unit MV and thus may use the refined predictor as a final predictor.

For another example, a detailed procedure for the aforementioned method may be as shown in the following table.

TABLE 7

IF (($\tau_0$ = $\tau_1$) && (mvx$_0$ == -mvx$_1$) && (mvy$_0$ = -mvy$_1$) && sub-PU=4×4)
  Not perform BIO.

TABLE 7-continued

Select the bi-prediction predictor as the optimal predictor.
ELSE
  Perform BIO
  Select the BIO predictor as the optimal predictor.

As shown in Table 7 above, if the first time distance and the second time distance have the same magnitude, if an x-component of the MVL0 and an x-component of the MVL1 have the same magnitude and different signs, if a y-component of the MVL0 and a y-component of the MVL1 have the same magnitude and different signs, and if a size of the current block is 4×4, the coding device may use a predictor derived based on the MVL0 and the MVL1 as a final predictor without having to perform the BIO prediction. In addition, if it is not the case, the coding device may derive the sample-unit MV of the current block based on the MVL0 and the MVL1, and may derive a refined predictor based on the sample-unit MV and thus may use the refined predictor as a final predictor.

For another example, the coding device may consider an inter-prediction mode (a merge mode, an AMVP mode, etc.) of the current block in the determining of whether to apply BIO prediction of the current block. In general, the merge mode or a frame rate up-conversion (FRUC) merge mode may be applied to encode a prediction block of a region in which there is no or little motion. The FRUC merge mode may be a mode in which a motion vector indicating a reference block having a smallest residual with respect to the current block among MVs of neighboring blocks of the current block is derived as a motion vector of the current block under the assumption that an object in an image moves with a constant speed and a sample value indicating the object is not changed. The prediction block in the region in which there is no or little motion may derive an excellent predictor, that is, a predictor having a small residual, even if only the bi-prediction is performed. Therefore, deterioration of encoding performance may be not significant even if there is no additional BIO prediction performed for the prediction block. A detailed procedure for the aforementioned method may be as shown in the following table.

TABLE 8

IF coding mode == merge mode or FRUC merge mode
  NOT perform BIO.
  Select the bi-prediction predictor as the optimal predictor.
ELSE
  Perform BIO
  Select the BIO predictor as the optimal predictor.

As shown in Table 7 above, if the inter-prediction mode of the current block is the merge mode or the FRUC merge mode, the coding device may use a predictor derived based on the MVL0 and the MVL1 as a final predictor without having to perform the BIO prediction. In addition, if it is not the case, the coding device may derive the sample-unit MV of the current block based on the MVL0 and the MVL1, and may derive a refined predictor based on the sample-unit MV and thus may use the refined predictor as a final predictor.

The method shown in Table 7 above, that is, the method of determining whether to apply BIO prediction of the current block under the condition of whether the merge mode or the FRUC merge mode is applied to the current block, may be used alone, or may be used with an additional condition of the method shown in Table 3, Table 4, and Table 6 above. For example, if a value obtained by multiplying the x-component of the MVL0 by the second time distance and a value obtained by multiplying the x-component of the MVL1 by the first time distance have the same magnitude and different signs, if a value obtained by multiplying the y-component of the MVL0 by the second time distance and a value obtained by multiplying the y-component of the MVL1 by the first time distance have the same magnitude and different signs, and if the merge mode or the FRUC merge mode is applied to the current block, the coding device may use a predictor derived based on the MVL0 and the MVL1 as a final predictor without having to perform the BIO prediction.

For another example, if the first time distance and the second time distance have the same magnitude, if an x-component of the MVL0 and an x-component of the MVL1 have the same magnitude and different signs, if a y-component of the MVL0 and a y-component of the MVL1 have the same magnitude and different signs, and if the merge mode or the FRUC merge mode is applied to the current block, the coding device may use a predictor derived based on the MVL0 and the MVL1 as a final predictor without having to perform the BIO prediction.

For another example, if a value obtained by multiplying the x-component of the MVL0 by the second time distance and a value obtained by multiplying the x-component of the MVL1 by the first time distance have the same magnitude and different signs, if a value obtained by multiplying the y-component of the MVL0 by the second time distance and a value obtained by multiplying the y-component of the MVL1 by the first time distance have the same magnitude and different signs, if a size of the current block is 4×4, and if the merge mode or the FRUC merge mode is applied to the current block, the coding device may use a predictor derived based on the MVL0 and the MVL1 as a final predictor without having to perform the BIO prediction.

Meanwhile, an encoding device may transmit to a decoding device a flag indicating whether to apply BIO prediction. That is, the encoding device may transmit to the decoding device the flag indicating whether to perform the BIO prediction of the current block. The flag may be called a BIO usage flag. The encoding device may transmit information indicating whether to perform the BIO prediction of the current block through the flag. For example, if it is determined to apply the BIO prediction to the current block, a value of the BIO usage flag may be 1, and if it is determined not to apply the BIO prediction to the current block, the value of the BIO usage flag may be 0. In addition, for example, the BIO usage flag may be transmitted in unit of a PU. Alternatively, the BIO usage flag may be transmitted in unit of a CU, a CTU, or a slice, or may be transmitted through a higher layer such as in unit of a picture parameter set (PPS) or a sequence parameter set (SPS).

Meanwhile, the decoding device may determine whether to apply the BIO prediction of the current block based on the BIO usage flag, instead of determining whether to apply the BIO prediction under the condition based on Table 3, Table 4, Table 6, and Table 7 above. In addition, if the BIO usage flag is not transmitted, the decoding device may determine that the value of the BIO usage flag is 0 and thus may determine not to apply that the BIO prediction of the current block.

Figure 5:
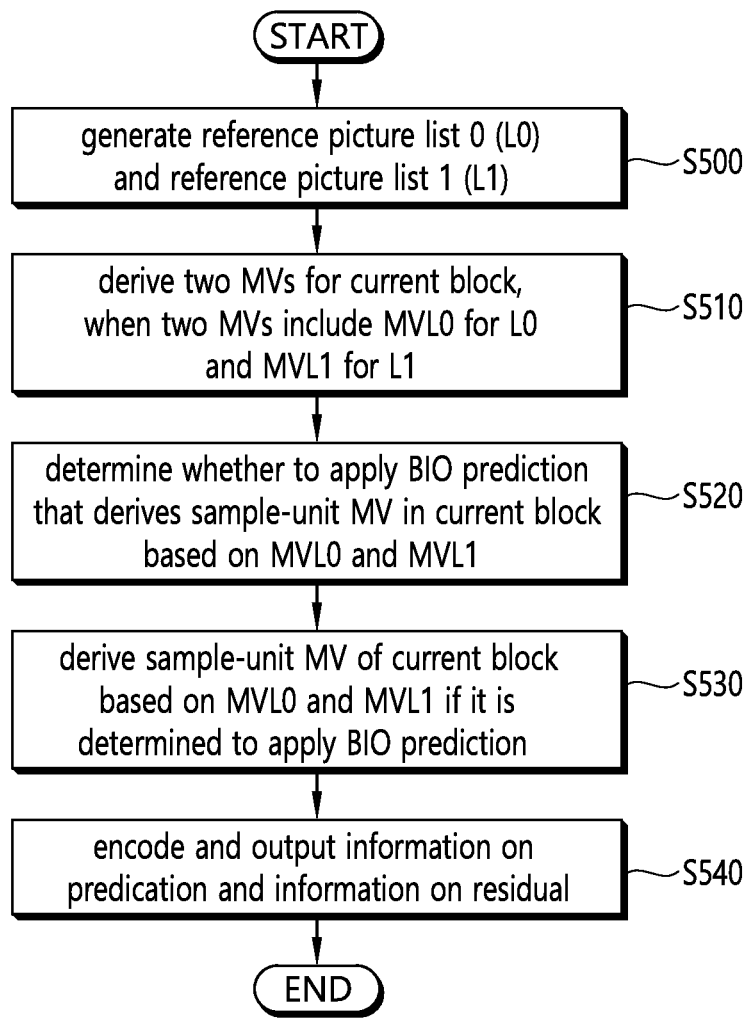
FIG. 5 briefly shows a video encoding method performed by an encoding device according to the present invention.

FIG. 5 briefly shows a video encoding method performed by an encoding device according to the present invention. The method disclosed in FIG. 5 may be performed by the encoding device disclosed in FIG. 1. Specifically, for example, S500 to S530 of FIG. 5 may be performed by a prediction unit of the encoding device, and S540 may be performed by an entropy encoding unit of the encoding device.

The encoding device generates a reference picture list 0 (L0) and a reference picture list 1 (L1) (S500). The encoding device may generate the reference picture list 0 (L0) and the reference picture list 1 (L1). The reference picture list 0 may be called a list 1 (L1), and the reference picture list 1 may be called a list 1 (L1).

The encoding device derives two motion vectors (MVs) for a current block, and the two MVs include an MVL0 for the L0 and an MVL1 for the L1 (S510). The encoding device may derive the two MVs when the current block is included in a B-slice and bi-prediction is applied to the current block. In this case, the encoding device may derive optimal MVs through motion estimation. The two MVs may be the MVL0 for the L0 and the MVL1 for the L1.

The encoding device may indicate two MBs for the current block by using neighboring blocks of the current block (if the current block is a current PU) or neighboring blocks of a current PU including the current block (if the current block is a current sub PU). For example, the encoding device may generate a candidate list based on the neighboring blocks or MVs of the neighboring blocks, and may signal an index indicating a specific candidate in the candidate list to a decoding device by including the index into the information for the prediction.

The encoding device determines whether to apply bi-prediction optical-flow (BIO) prediction that derives a sample-unit MV in the current block based on the MVL0 and the MVL1 (S520). The encoding device may determine whether to perform the BIO prediction of the current block based on the two MVs. That is, whether to derive the sample-unit MV may be determined based on the two MVs. In addition, the encoding device may derive a first time distance between the current picture and a first reference picture associated win the MVL0 among reference pictures included in the L0 and a second time distance between the current picture and a second reference picture associated with the MVL1 among reference pictures included in the L1 to determine whether to apply the BIO prediction of the current block. The first time distance may be derived as a difference between a picture order count (POC) value of the current picture and a POC value of the first reference picture, and the second time distance may be derived as a difference between a POC value of the second reference picture and the POC value of the current picture.

As an example of determining whether to apply the BIO prediction, if a value obtained by multiplying the x-component of the MVL0 by the second time distance and a value obtained by multiplying the x-component of the MVL1 by the first time distance have the same magnitude and different signs, and if a value obtained by multiplying the y-component of the MVL0 by the second time distance and a value obtained by multiplying the y-component of the MVL1 by the first time distance have the same magnitude and different signs, the encoding device may determine not to apply the BIO prediction. In other words, if an absolute value of a first vector derived by multiplying the MVL0 by the second time distance is equal to an absolute value of a second vector derived by multiplying the MVL1 by the second time distance and if the first vector and the second vector have directions opposite to each other, the encoding device may determine not to apply the BIO prediction.

For another example, if the first time distance and the second time distance have the same magnitude, if an x-component of the MVL0 and an x-component of the MVL1 have the same magnitude and different signs, and if a y-component of the MVL0 and a y-component of the MVL1 have the same magnitude and different signs, the encoding device may determine not to perform the BIO prediction.

For another example, if a value obtained by multiplying the x-component of the MVL0 by the second time distance and a value obtained by multiplying the x-component of the MVL1 by the first time distance have the same magnitude and different signs, if a value obtained by multiplying the y-component of the MVL0 by the second time distance and a value obtained by multiplying the y-component of the MVL1 by the first time distance have the same magnitude and different signs, and if a size of the current block is 4×4, the encoding device may determine not to apply the BIO prediction.

For another example, if the first time distance and the second time distance have the same magnitude, if an x-component of the MVL0 and an x-component of the MVL1 have the same magnitude and different signs, if a y-component of the MVL0 and a y-component of the MVL1 have the same magnitude and different signs, and if a size of the current block is 4×4, the encoding device may determine not to apply the BIO prediction.

For another example, if the merge mode is applied to the current block, the encoding device may determine not to apply the BIO prediction.

For another example, if a value obtained by multiplying the x-component of the MVL0 by the second time distance and a value obtained by multiplying the x-component of the MVL1 by the first time distance have the same magnitude and different signs, if a value obtained by multiplying the y-component of the MVL0 by the second time distance and a value obtained by multiplying the y-component of the MVL1 by the first time distance have the same magnitude and different signs, and if the merge mode is applied to the current block, the encoding device may determine not to apply the BIO prediction.

For another example, if the first time distance and the second time distance have the same magnitude, an x-component of the MVL0 and an x-component of the MVL1 have the same magnitude and different signs, if a y-component of the MVL0 and a y-component of the MVL1 have the same magnitude and different signs, and if the merge mode is applied to the current block, the encoding device may determine not to apply the BIO prediction.

For another example, if a value obtained by multiplying the x-component of the MVL0 by the second time distance and a value obtained by multiplying the x-component of the MVL1 by the first time distance have the same magnitude and different signs, if a value obtained by multiplying the y-component of the MVL0 by the second time distance and a value obtained by multiplying the y-component of the MVL1 by the first time distance have the same magnitude and different signs, if a size of the current block is 4×4, and if the merge mode is applied to the current block, the encoding device may determine not to apply the BIO prediction.

For another example, if the first time distance and the second time distance have the same magnitude, if an x-component of the MVL0 and an x-component of the MVL1 have the same magnitude and different signs, if a y-component of the MVL0 and a y-component of the MVL1 have the same magnitude and different signs, if a size of the current block is 4×4, and if the merge mode is applied to the current block, the encoding device may determine not to apply the BIO prediction.

Meanwhile, the encoding device may obtain a flag indicating whether to apply the BIO prediction. The flag may be called a BIO usage flag. If a value the BIO usage flag is 1, the decoding device may derive the sample-unit MV based on the MVL0 and MVL1 for the current block, and may derive a prediction sample based on the sample-unit MV. In addition, if the value of the BIO usage flag is 0, the decoding device may derive a prediction sample for a current sample based on the MVL0 and the MVL1. In addition, if it is determined not to apply the BIO prediction, the encoding device may not transmit the BIO usage flag, and if the BIO usage flag is not transmitted, the decoding device may determine not to apply the BIO prediction.

The encoding device derives the sample-unit MV of the current block based on the MVL0 and the MVL1 if it is determined to apply the BIO prediction (S530). The sample-unit MV may be derived based on Equations 6 to 13 above. For example, if a target sample has a coordinate of [i,j], then $v_x[i,j]$ and $v_y[i,j]$ which allow $\Delta^2[i,j]$ of Equation 6 above to have a minimum value may be an x-component and y-component of the refined MV. In addition, the sample-unit MV for the target sample may be derived based on Equation 18 and Equation 20 which are obtained through approximation of Equation 13 above.

The prediction sample derived based on the sample-unit MV may be derived based on Equation 14 above. In addition, if the first time distance and the second time distance are different from each other, the prediction sample may be derived based on Equation 15 above. The prediction sample derived based on the sample-unit MV may be called a refined prediction sample or a BIO prediction sample.

The encoding device encodes and outputs the information on the predication and the information on the residual (S540). The encoding device may encode the information on the prediction and the information on the residual and output the information in a form of bit-stream. The bit-stream may be transmitted to the decoding device through a network or a storage medium.

The information on the prediction may further include prediction mode information of the current block. The prediction mode information may indicate an inter-prediction mode to be applied to the current block.

In addition, the encoding device may encode the BIO usage flag to be output in the form of bit-stream. The BIO usage flag may indicate whether to apply the BIO prediction. For example, the BIO usage flag may be transmitted in unit of a PU. Alternatively, the BIO usage flag may be transmitted in unit of a CU, a CTU, or a slice, or may be transmitted through a higher layer such as in unit of a picture parameter set (PPS) or a sequence parameter set (SPS).

The encoding device may generate a residual sample based on an original sample of an original picture and the derived refined prediction sample. The encoding device may generate the information on the residual based on the residual sample. The information on the residual may include transform coefficients regarding the residual sample.

Meanwhile, although not shown in FIG. 5, if it is determined not to apply the BIO prediction, the encoding device may derive a prediction sample based on the MVL0 and the MVL1. The encoding device may generate a residual sample based on an original sample of an original picture and the derived prediction sample. The encoding device may generate the information on the residual based on the residual sample. The information on the residual may include transform coefficients regarding the residual sample.

Figure 6:
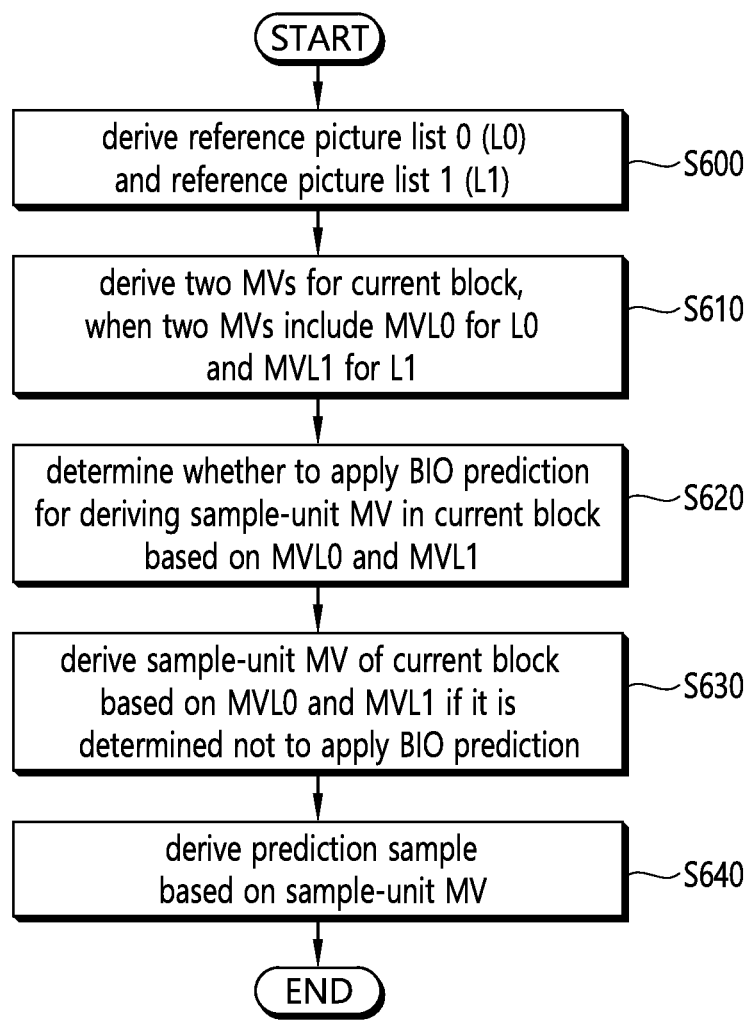
FIG. 6 briefly shows a video decoding method performed by a decoding device according to the present invention.

FIG. 6 briefly shows a video decoding method performed by a decoding device according to the present invention. The method disclosed in FIG. 6 may be performed by the decoding device disclosed in FIG. 2. Specifically, for example, S600 to S630 of FIG. 6 may be performed by a prediction unit of the decoding device, and S640 may be performed by an adder of the decoding device.

The decoding device derives a reference picture list 0 (L0) and a reference picture list 1 (L1) (S600). The decoding device may derive the reference picture list 0 (L0) and the reference picture list 1 (L1). The reference picture list 0 may be called a list 0 (L0), and the reference picture list 1 may be called a list 1 (L1).

The decoding device derives two motion vectors (MVs) for a current block, and the two MVs include an MVL0 for the L0 and an MVL1 for the L1 (S610). The decoding device may obtain information on prediction through a bit-stream, and may derive an inter-prediction mode applied to the current block based on the information on the prediction.

The decoding device may derive the two MVs when the current block is included in a B-slice and bi-prediction is applied to the current block. The two MVs may be the MVL0 for the L0 and the MVL1 for the L1.

The decoding device may derive two MBs for the current block by using neighboring blocks of the current block (if the current block is a current PU) or neighboring blocks of a current PU including the current block (if the current block is a current sub PU). For example, the decoding device may generate a candidate list based on the neighboring blocks or MVs of the neighboring blocks, and may select a specific candidate based on an index indicating the specific candidate in the candidate list. The index may include the aforementioned information on the prediction.

The decoding device determines whether to apply bi-prediction optical flow (BIO) prediction for deriving a sample-unit MV in the current block based on the MVL0 and the MVL1 (S620). The decoding device may determine whether to apply the BIO prediction of the current block based on the MVL0 and the MVL1. That is, whether to derive the sample-unit MV may be determined based on the MVL0 and the MVL1. In addition, the decoding device may derive a first time distance between the current picture and a first reference picture associated win the MVL0 among reference pictures included in the L0 and a second time distance between the current picture and a second reference picture associated with the MVL1 among reference pictures included in the L1 to determine whether to apply the BIO prediction. The first time distance may be derived as a difference between a picture order count (POC) value of the current picture and a POC value of the first reference picture, and the second time distance may be derived as a difference between a POC value of the second reference picture and the POC value of the current picture.

As an example of determining whether to apply the BIO prediction, if a value obtained by multiplying the x-component of the MVL0 by the second time distance and a value obtained by multiplying the x-component of the MVL1 by the first time distance have the same magnitude and different signs, and if a value obtained by multiplying the y-component of the MVL0 by the second time distance and a value obtained by multiplying the y-component of the MVL1 by the first time distance have the same magnitude and different signs, the decoding device may determine not to apply the BIO prediction. In other words, if an absolute value of a first vector derived by multiplying the MVL0 by the second time distance is equal to an absolute value of a second vector derived by multiplying the MVL1 by the second time distance and if the first vector and the second vector have directions opposite to each other, the decoding device may determine not to apply the BIO prediction.

For another example, if the first time distance and the second time distance have the same magnitude, if an x-component of the MVL0 and an x-component of the MVL1 have the same magnitude and different signs, and if a y-component of the MVL0 and a y-component of the MVL1 have the same magnitude and different signs, the decoding device may determine not to perform the BIO prediction.

For another example, if a value obtained by multiplying the x-component of the MVL0 by the second time distance and a value obtained by multiplying the x-component of the MVL1 by the first time distance have the same magnitude and different signs, if a value obtained by multiplying the y-component of the MVL0 by the second time distance and a value obtained by multiplying the y-component of the MVL1 by the first time distance have the same magnitude and different signs, and if a size of the current block is 4×4, the decoding device may determine not to apply the BIO prediction.

For another example, if the first time distance and the second time distance have the same magnitude, if an x-component of the MVL0 and an x-component of the MVL1 have the same magnitude and different signs, if a y-component of the MVL0 and a y-component of the MVL1 have the same magnitude and different signs, and if a size of the current block is 4×4, the decoding device may determine not to apply the BIO prediction.

For another example, if the merge mode is applied to the current block, the decoding device may determine not to apply the BIO prediction.

For another example, if a value obtained by multiplying the x-component of the MVL0 by the second time distance and a value obtained by multiplying the x-component of the MVL1 by the first time distance have the same magnitude and different signs, if a value obtained by multiplying the y-component of the MVL0 by the second time distance and a value obtained by multiplying the y-component of the MVL1 by the first time distance have the same magnitude and different signs, and if the merge mode is applied to the current block, the decoding device may determine not to apply the BIO prediction.

For another example, if the first time distance and the second time distance have the same magnitude, an x-component of the MVL0 and an x-component of the MVL1 have the same magnitude and different signs, if a y-component of the MVL0 and a y-component of the MVL1 have the same magnitude and different signs, and if the merge mode is applied to the current block, the decoding device may determine not to apply the BIO prediction.

For another example, if a value obtained by multiplying the x-component of the MVL0 by the second time distance and a value obtained by multiplying the x-component of the MVL1 by the first time distance have the same magnitude and different signs, if a value obtained by multiplying the y-component of the MVL0 by the second time distance and a value obtained by multiplying the y-component of the MVL1 by the first time distance have the same magnitude and different signs, if a size of the current block is 4×4, and if the merge mode is applied to the current block, the decoding device may determine not to apply the BIO prediction.

For another example, if the first time distance and the second time distance have the same magnitude, if an x-component of the MVL0 and an x-component of the MVL1 have the same magnitude and different signs, if a y-component of the MVL0 and a y-component of the MVL1 have the same magnitude and different signs, if a size of the current block is 4×4, and if the merge mode is applied to the current block, the decoding device may determine not to apply the BIO prediction.

Meanwhile, the decoding device may obtain a flag indicating whether to apply the BIO prediction through the bit-stream. The flag may be called a BIO usage flag. If a value of the BIO usage flag is 1, the decoding device may derive the sample-unit MV based on the MVL0 and MVL1 for the current block, and may derive a refined prediction sample based on the sample-unit MV. In addition, if the value of the BIO usage flag is 0, the decoding device may derive a prediction sample for a current sample based on the MVL0 and the MVL1. In addition, if it is determined not to apply the BIO prediction, the encoding device may not transmit the BIO usage flag. In this case, if the BIO usage flag is not obtained through the bit-stream, the decoding device may determine not to apply the BIO prediction without an additional determination process. For example, the BIO usage flag may be transmitted in unit of a PU. Alternatively, the BIO usage flag may be transmitted in unit of a CU, a CTU, or a slice, or may be transmitted through a higher layer such as in unit of a picture parameter set (PPS) or a sequence parameter set (SPS).

If it is determined not to apply the BIO prediction, the decoding device derives the sample-unit MV of the current block based on the MVL0 and the MVL1 (S630). The sample-unit MV may be derived based on Equations 6 to 13 above. For example, if a target sample has a coordinate of kW, then $v_x[i,j]$ and $v_y[i,j]$ which allow $\alpha^2[i,j]$ of Equation 6 above to have a minimum value may be an x-component and y-component of the sample-unit MV. In addition, the sample-unit MV may be derived based on Equation 18 and Equation 20 which are obtained through approximation of Equation 13 above.

The prediction sample derived based on the sample-unit MV may be derived based on Equation 14 above. In addition, if the first time distance and the second time distance are different from each other, the prediction sample may be derived based on Equation 15 above. The prediction sample may be called a refined prediction sample or a BIO prediction sample.

The decoding device derives the prediction sample based on the sample-unit MV (S640). The decoding device may derive the prediction sample based on the sample-unit MV. The prediction sample for the target sample may be derived based on Equation 14 above. In addition, if the first time distance and the second time distance are different from each other, the prediction sample for the target sample may be derived based on Equation 15 above.

The decoding device may use the prediction sample directly as a reconstruction sample according to the prediction mode, or may generate the reconstruction sample by adding a residual sample to the prediction sample.

In the presence of a residual sample for the current block, the decoding device may obtain information on a residual for the current block from the bit-steam. The information on the residual may include a transform coefficient for the residual sample. The decoding device may derive the residual sample by using the transform coefficient obtained from the bit-steam.

The decoding device may derive a reconstruction picture based on the reconstruction sample.

Meanwhile, although not shown in FIG. 6, if it is determined not to apply the BIO prediction, the decoding device may derive a prediction sample for the target sample based on the MVL0 and the MVL1. The decoding device may use the prediction sample directly as a reconstruction sample according to the prediction mode, or may generate the reconstruction sample by adding a residual sample to the prediction sample.

In the presence of a residual sample for the current block, the decoding device may obtain information on a residual for the current block from the bit-steam. The information on the residual may include a transform coefficient for the residual sample. The decoding device may derive the residual sample by using the transform coefficient obtained from the bit-steam.

According to the aforementioned present invention, computational complexity of inter-prediction which uses a sample-unit motion vector can be decreased by determining whether to apply BIO prediction of a current block, thereby being able to improve overall coding efficiency.

In addition, according to the present invention, optimal prediction samples can be obtained based on the sample-unit motion vector. Accordingly, an amount of data for a residual signal for a current block can be removed or decreased, and overall coding efficiency can be improved.

Although the aforementioned exemplary system has been described based on a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The method according to the present invention described above may be implemented in software. The encoding device and/or decoding device according to the present invention may be included in a device that performs image processing, for example, for a TV, a computer, a smart phone, a set-top box, or a display device.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. A video decoding method performed by a decoding device, the method comprising:
   deriving a reference picture list 0 (L0) and a reference picture list 1 (L1);
   deriving two motion vectors (MVs) for a current block, wherein the two MVs include an MVL0 for the L0 and an MVL1 for the L1;
   obtaining bi-prediction optical-flow (BIO) usage flag from a picture parameter set (PPS) or a sequence parameter set (SPS) signaled from a bitstream;
   determining whether to apply BIO prediction that derives a sample-unit MV in the current block based on the MVL0 and the MVL1;
   deriving the sample-unit MV of the current block based on the MVL0 and the MVL1 based on a determination to apply the BIO prediction; and deriving a prediction sample based on the sample-unit MV, wherein the determining of whether to apply the BIO prediction comprises:

deriving a first time distance between the current picture and a first reference picture associated with the MVL0 among the reference pictures included in the L0;

deriving a second time distance between the current picture and a second reference picture associated with the MVL1 among the reference pictures included in the L1; and determining, based on the BIO usage flag, whether to apply the BIO prediction based on the first time distance and the second time distance, wherein the first time distance is a difference between a picture order count (POC) value of the current picture and a POC value of the first reference picture, and wherein the second time distance is a difference between a POC value of the second reference picture and the POC value of the current picture.

2. The method of claim 1, wherein the sample-unit MV is derived based on the following equation:

$$\Delta I[i,j] = I^{(0)}[i,j] - I^{(1)}[i,j] + v_x[i,j](I_x^{(0)}[i,j] + I_x^{(1)}[i,j]) + v_y[i,j](I_y^{(0)}[i,j] + I_y^{(1)}[i,j])$$

where [i,j] is a coordinate of a target sample, $\Delta I[i, j]$ is a difference between a value of a first reference sample indicated by the MVL0 in the first reference picture in the L0 and a value of a second reference sample indicated by the MVL1 in the second reference picture in the L1, $I^{(0)}[i,j]$ is a value of an L0 reference sample at a position [i,j] in the first reference picture in the L0, $I^{(1)}[i,j]$ is a value of an L1 reference sample at a position [i,j] in the second reference picture in the L1, $I_x^{(0)}[i,j]$ and $I_y^{(0)}[i,j]$ are respectively x-axis and y-axis derivative values at a position [i,j] of the first reference picture, $I_x^{(1)}[i,j]$ and $I_y^{(1)}[i,j]$ are respectively x-axis and y-axis derivative values at a position [i,j] of the second reference picture, $v_x[i,j]$ and $v_y[i,j]$ are respectively an x-component and y-component of the sample-unit MV for the target sample, and $v_x[i,j]$ and $v_y[i,j]$ have values which allow $|\Delta I[i, j]|^2$ to have a minimum value.

3. The method of claim 1, wherein it is determined not to apply the BIO prediction if a value obtained by multiplying the x-component of the MVL0 by the second time distance and a value obtained by multiplying the x-component of the MVL1 by the first time distance have the same magnitude and different signs, and if a value obtained by multiplying the y-component of the MVL0 by the second time distance and a value obtained by multiplying the y-component of the MVL1 by the first time distance have the same magnitude and different signs, and wherein prediction samples of the current block are derived based on the MVL0 and the MVL1 if it is determined not to apply the BIO prediction.

4. The method of claim 1, wherein it is determined not to apply the BIO prediction if the first time distance and the second time distance have the same magnitude, an x-component of the MVL0 and an x-component of the MVL1 have the same magnitude and different signs, and if a y-component of the MVL0 and a y-component of the MVL1 have the same magnitude and different signs, and wherein prediction samples of the current block are derived based on the MVL0 and the MVL1 if it is determined not to apply the BIO prediction.

5. The method of claim 1, wherein it is determined not to apply the BIO prediction if a value obtained by multiplying the x-component of the MVL0 by the second time distance and a value obtained by multiplying the x-component of the MVL1 by the first time distance have the same magnitude and different signs, if a value obtained by multiplying the y-component of the MVL0 by the second time distance and a value obtained by multiplying the y-component of the MVL1 by the first time distance have the same magnitude and different signs, and if a size of the current block is 4×4, and wherein prediction samples of the current block are derived based on the MVL0 and the MVL1 if it is determined not to apply the BIO prediction.

6. The method of claim 1, wherein it is determined not to apply the BIO prediction if the first time distance and the second time distance have the same magnitude, an x-component of the MVL0 and an x-component of the MVL1 have the same magnitude and different signs, if a y-component of the MVL0 and a y-component of the MVL1 have the same magnitude and different signs, and if a size of the current block is 4×4, and wherein prediction samples of the current block are derived based on the MVL0 and the MVL1 if it is determined not to apply the BIO prediction.

7. The method of claim 1, wherein it is determined not to apply the BIO prediction if the merge mode is applied to the current block, and wherein prediction samples of the current block are derived based on the MVL0 and the MVL1 if it is determined not to apply the BIO prediction.

8. The method of claim 1, further comprising obtaining a BIO usage flag through a bit-stream, wherein it is determined not to apply the BIO prediction if a value of the BIO usage flag is 0, and wherein prediction samples of the current block are derived based on the MVL0 and the MVL1 if it is determined not to apply the BIO prediction.

9. A decoding device for performing image decoding, comprising a prediction unit configured to derive a reference picture list 0 (L0) and a reference picture list 1 (L1), derive two motion vectors (MVs) for a current block, obtain bi-prediction optical-flow (BIO) usage flag from a picture parameter set (PPS) or a sequence parameter set (SPS) signaled from a bitstream, determine whether to apply bi prediction BIO prediction that derives a sample-unit MV in the current block based on the MVL0 and the MVL1, derive the sample-unit MV of the current block based on the MVL0 and the MVL1 based on a determination to apply the BIO prediction, and derive a prediction sample based on the sample-unit MV, wherein the two MVs include an MVL0 for the L0 and an MVL1 for the L1, wherein the determining of whether to apply the BIO prediction comprises:

deriving a first time distance between the current picture and a first reference picture associated with the MVL0 among the reference pictures included in the L0;

deriving a second time distance between the current picture and a second reference picture associated with the MVL1 among the reference pictures included in the L1; and determining, based on the BIO usage flag, whether to apply the BIO prediction based on the first time distance and the second time distance, wherein the first time distance is a difference between a picture order count (POC) value of the current picture and a POC value of the first reference picture, and wherein the second time distance is a difference between a POC value of the second reference picture and the POC value of the current picture.

10. The decoding device of claim 9, wherein the sample-unit MV is derived based on the following equation:

$$\Delta I[i,j]=I^{(0)}[i,j]-I^{(1)}[i,j]+v_x[i,j](I_x^{(0)}[i,j]+I_x^{(1)}[i,j])+v_y[i,j](I_y^{(0)}[i,j]+I_y^{(1)}[i,j])$$

where [i,j] is a coordinate of a target sample, $\Delta I[i, j]$ is a difference between a value of a first reference sample indicated by the MVL0 in the first reference picture in the L0 and a value of a second reference sample indicated by the MVL1 in the second reference picture in the L1, $I^{(0)}[i,j]$ is a value of an L0 reference sample at a position [i,j] in the first reference picture in the L0, $I^{(1)}[i,j]$ is a value of an L1 reference sample at a position [i,j] in the second reference picture in the L1, $I_x^{(0)}[i,j]$ and $I_y^{(0)}[i,j]$ are respectively x-axis and y-axis derivative values at a position [i,j] of the first reference picture, $I_x^{(1)}[i,j]$ and $I_y^{(1)}[i,j]$ are respectively x-axis and y-axis derivative values at a position [i,j] of the second reference picture, $v_x[i,j]$ and $v_y[i,j]$ are respectively an x-component and y-component of the sample-unit MV for the target sample, and $v_x[i,j]$ and $v_y[i,j]$ have values which allow $|\Delta I[i, j]|^2$ to have a minimum value.

11. The decoding device of claim 9, wherein the predictor is configured to: determine not to apply the BIO prediction if a value obtained by multiplying the x-component of the MVL0 by the second time distance and a value obtained by multiplying the x-component of the MVL1 by the first time distance have the same magnitude and different signs, and if a value obtained by multiplying the y-component of the MVL0 by the second time distance and a value obtained by multiplying the y-component of the MVL1 by the first time distance have the same magnitude and different signs; and derive prediction samples of the current block based on the MVL0 and the MVL1 if it is determined not to apply the BIO prediction.

12. The decoding device of claim 9, wherein the prediction unit is configured to: determine not to apply the BIO prediction if the first time distance and the second time distance have the same magnitude, an x-component of the MVL0 and an x-component of the MVL1 have the same magnitude and different signs, and if a y-component of the MVL0 and a y-component of the MVL1 have the same magnitude and different signs; and derive prediction samples of the current block based on the MVL0 and the MVL1 if it is determined not to apply the BIO prediction.

13. The decoding device of claim 9, wherein the prediction unit is configured to: determine not to apply the BIO prediction if a value obtained by multiplying the x-component of the MVL0 by the second time distance and a value obtained by multiplying the x-component of the MVL1 by the first time distance have the same magnitude and different signs, if a value obtained by multiplying the y-component of the MVL0 by the second time distance and a value obtained by multiplying the y-component of the MVL1 by the first time distance have the same magnitude and different signs, and if a size of the current block is 4×4; and derive prediction samples of the current block based on the MVL0 and the MVL1 if it is determined not to apply the BIO prediction.

* * * * *